Sept. 21, 1943.  T. F. BRACKETT  2,329,818
PHOTOCELL CONTROL
Original Filed July 31, 1937  2 Sheets-Sheet 1
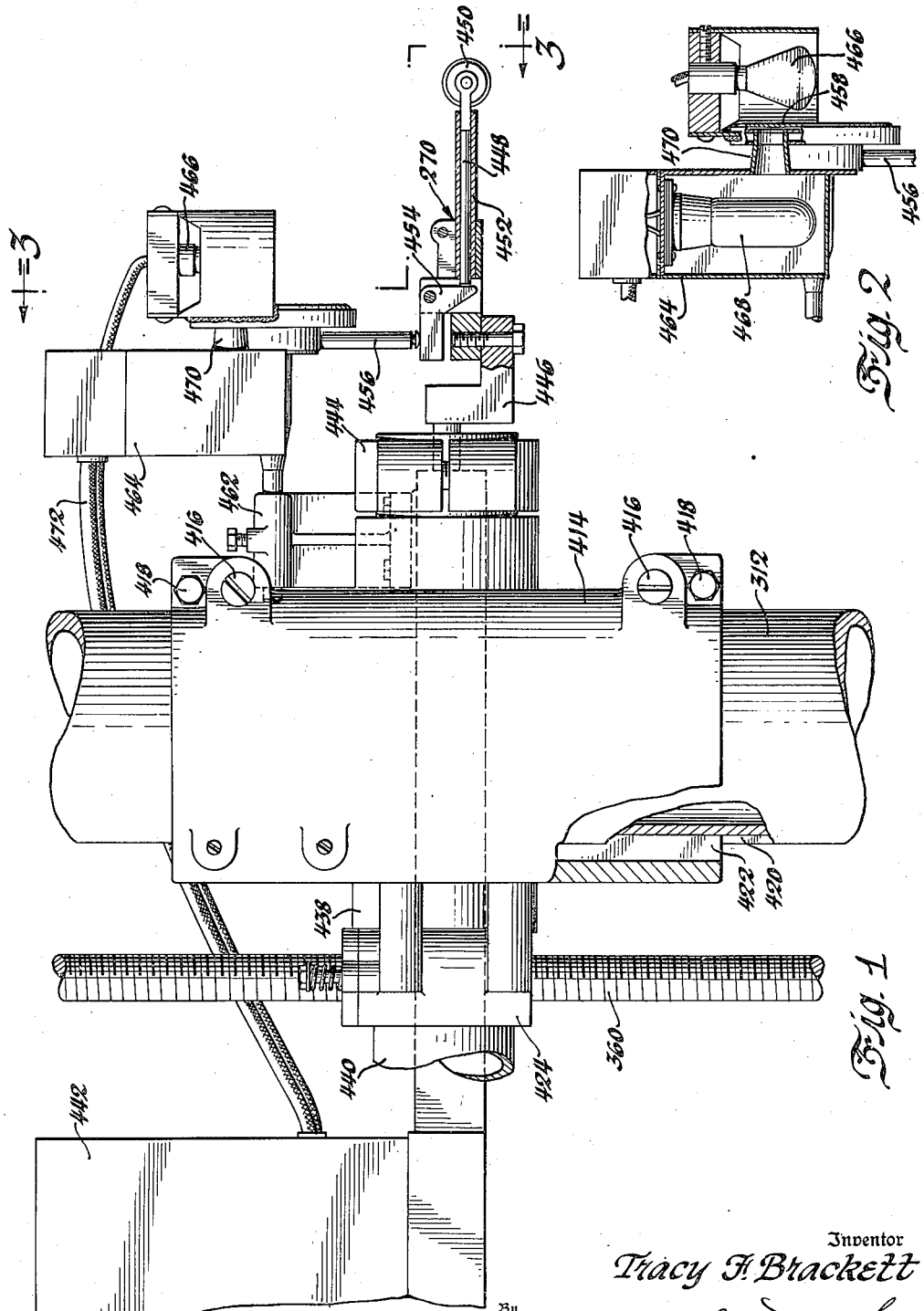
Inventor
Tracy F. Brackett
By
Blackmore, Spencer & Flint
Attorneys Sept. 21, 1943.   T. F. BRACKETT   2,329,818
PHOTOCELL CONTROL
Original Filed July 31, 1937   2 Sheets-Sheet 2

Inventor
Tracy F. Brackett
By Blackmore, [illegible] & [illegible]
Attor[neys]

Patented Sept. 21, 1943

2,329,818

UNITED STATES PATENT OFFICE 2,329,818

PHOTOCELL CONTROL

Tracy F. Brackett, Detroit, Mich., assignor to General Motors Corporation, Detroit, Mich., a corporation of Delaware Original application July 31, 1937, Serial No. 156,644, now Patent No. 2,242,506, dated May 20, 1941. Divided and this application December 13, 1940, Serial No. 369,962

4 Claims. (Cl. 90—62)

This invention relates to control apparatus and more particularly to control means actuated by scanning movement over a surface to operate actuating mechanisms.

In the operation of scanning means for controlling various types of apparatus, it is necessary to provide corrective or operative means which will be energized if the contacting portion of the apparatus moves in either direction from a neutral point. Thus if the device is used for checking tolerances of material, let us say for thickness, if the limits are either too low or too high certain actuating apparatus must be energized.

It is often desirable to reproduce surfaces or contours for various reasons from a model or master. One of these applications which might be mentioned is the necessity of making additional models from a master body for automobiles. This may be done by some scanning means passing over the contour or surface of the master and controlling cutting means to reform the same body contour. A machine of this general type is disclosed in my copending application Serial No. 156,644, filed July 31, 1937, entitled "Photo-cell control for die-sinking machine," and of which the present application is a division, and which has matured into Patent No. 2,242,506 of May 20, 1941. This application therefore deals particularly with the construction of the control means. This control mechanism is operable on such a small movement and may control considerable power so that it may be used for a plurality of other uses beside the control of a duplicating machine, such as an inspection gage, the current from the control operating a rejection machine, or it may be used as a control for a centerless grinder by having the follower ride over the work, the current therefrom depending upon the center position, causing either increase or decrease in the size of the grinder, and many other uses of which these are merely examples.

It is therefore an object of my invention to provide a follower control mechanism for actuating driving means.

It is a further object of my invention to provide control means which are operated by very slight pressures and also by very slight movement.

It is a still further object of my invention to provide control means which will energize a different actuating means upon the follower moving in either direction from a neutral position.

With the above and other objects in view, my invention will be best understood by reference to the following specification and claims and the illustrations in the accompanying drawings, in which:

Figure 1 is a vertical view of the control head of my invention, parts being shown in section;

Figure 2 is a sectional view through the light responsive portion of the control means.

Figure 3:
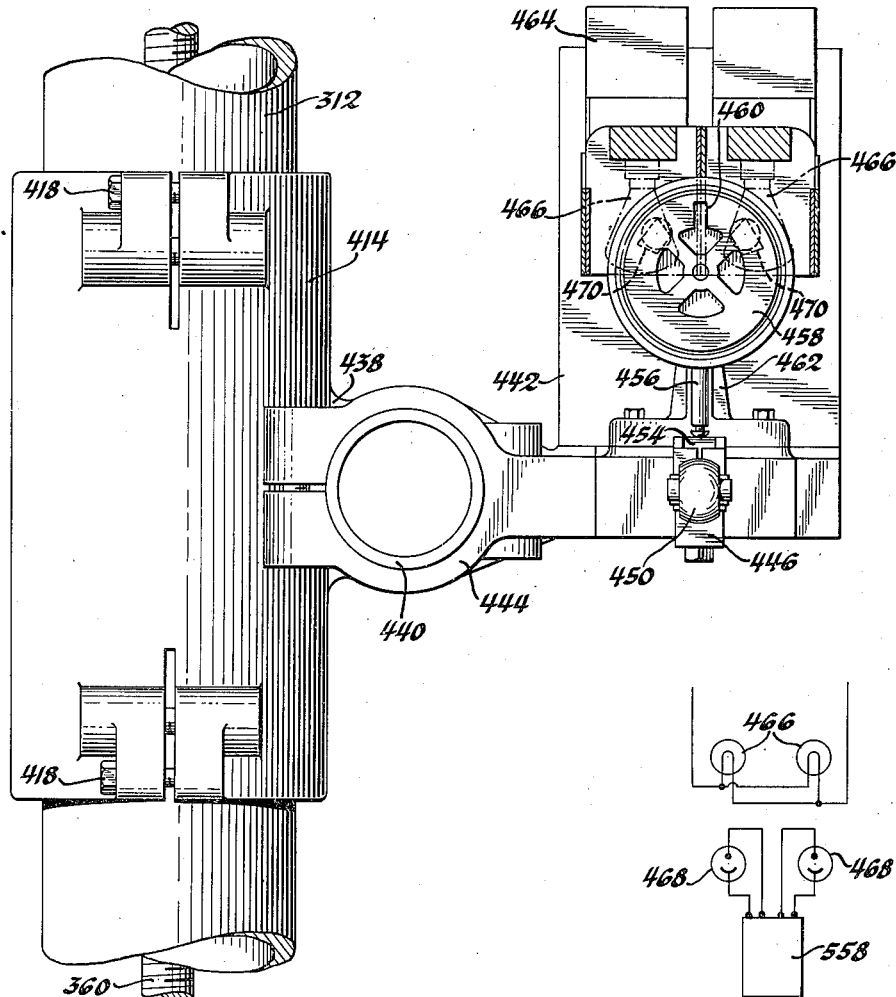
Figure 3 is a vertical view taken at right angles to that of Figure 1 on line 3—3 of Figure 1.

Referring now more specifically to Figure 1, the control means as an assembly of parts is herein shown mounted upon a vertical support such as 312 by the mounting bracket 414 which is in reality a split sleeve forming a cylinder, said split sleeve having bolts 416 extending through bosses on the side thereof to clamp the two portions together. These bosses also have threaded through one of the cooperating portions bolts 418, the projecting end of which extends against the surface of the corresponding boss to act as a stop to adjust the size of the cylindrical sleeve so that the sleeve may fit snugly upon various sizes of supports such as the tube 312, but allow the cylinder to slide thereon. In the outer surface of the support 312 on one side is formed a keyway 420 and on the inner surface of the sleeve is formed a projecting key 422 which extends into the keyway and is slidable therein to keep the sleeve from rotating on the shaft or support.

Extending from the side of the sleeve is an extension 424 secured to the face thereof and through the center of which is provided a threaded opening through which is adapted to pass a vertical threaded rod 360. This rod may be driven by any means to feed the control mechanism over any desired surface or to any desired point. Since the extension 424 is integral with the sleeve, any movement thereof will force the sleeve up or down on the vertically stationary rod, depending upon the direction of rotation of the threaded rod.

A boss 438 extends to one side of the sleeve member 414, is rigidly secured thereto and carries a hollow shaft 440, one end of which supports a photocell amplifier assembly 442 which may be any commercial amplification system housed within a suitable container. Also supported from a bracket 444 carried by the forward end of the hollow tube is a supporting arm 446 for the mechanical follower which in this case is composed of a horizontally slidable rod 448 having thereon a rotatable wheel 450, the wheel being adapted to travel over the surface to be measured or duplicated and the irregularities therein cause the rod 448 to move back and forth in the sleeve 452, the inner end of the rod lying adjacent one end of a pivoted bell crank lever 454 which is supported on the arm 446.

Also supported by suitable means from the main sleeve 414 is a bracket 462 which in turn supports a housing 464 in which are located a plurality of light sources 466 and a second spaced covered portion houses a plurality of photo-sensitive cells 468. Between the two shells or housings which enclose these sources of light and the cooperating photo-sensitive elements there are provided short sleeve-like apertures 470 through which light may pass from one source to its associated cell. Independently and rotatably supported in front of these openings is the shutter mechanism 458. The shutter is connected to rod 456 and caused to rotate about its pivot by longitudinal movement of the rod which contacts the opposite end of the bell crank lever 454. The shutter is so designed that when the rod 456 is moved in one direction from what may be termed "neutral" or balanced position, an opening 460 in the shutter allows light to pass from one of the sources to one of the photo-electric cells through the passage 470 which thus energizes its amplifier located at 442 to allow current to flow to energize some main control equipment and at the same time causing the corrective feed so that the shutter will again be returned to neutral. If, however, the follower 450 takes the opposite motion, the other light aperture will be opened by the shutter and the opposite photo-electric cell will allow energization of other driving means to move the necessary means in the opposite direction to correct and bring the mechanism back to zero or neutral. Suitable cables 472 are of course provided for connecting the light source and the photo-cells to the amplifier and other desired equipment.

As shown, the control device is supported in a vertical position on a rod or pillar 312 and is adapted to be fed by suitable apparatus, not shown, over the surface of a model or master which it is desired to reproduce. As the curvature of the surface of the model over which the follower 450 is fed changes, the rod 448 will either force the bell crank lever 454 clockwise or counterclockwise, depending upon the change in curvature, to cause the shutter 458 to be moved in one direction or the other and the energization of either of the photo-electric cells. This will cause the energization, as explained above, of certain driving means to move the mechanism at right angles to the constant drive over the surface or in the direction of movement of the tracer head to thus correct or reproduce the curvature of the surface being scanned. Here the actual work being done would not be on the piece being scanned and it is therefore necessary at the same time that the corrective movement is made on the tracing mechanism to move the tracer head itself inasmuch as the model is not altered so that only the necessary correction will be made and the device will not keep on trying to correct in the same direction. Thus it is necessary that all of the equipment being moved at right angles to the normal travel move together. This would not be true if the tracer were being used as a limit gage since the material always moves with respect to the tracer to operate rejection means or other apparatus and the correction of the work piece itself either in thickness or other factor would return the shutter to its neutral position.

The supporting means shown here is also merely exemplary as any suitable means may be used for this purpose and in the case of the use as a gage or grinder control the support may be stationary throughout its operation.

Figure 4:
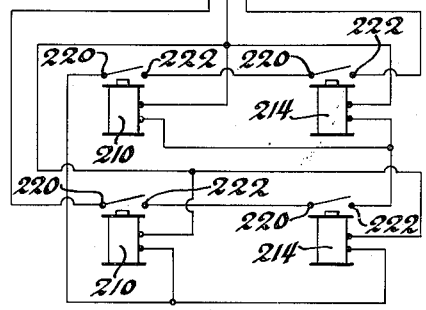
Figure 4 is a schematic wiring diagram showing the wiring of the control portion of the circuit.

In Figure 4 there is shown a portion of a control circuit in which the two sources of light 466 are connected to a suitable source of power and the two photo-electric cells or light sensitive elements 468 which cooperate with the sources of light feed into the amplifiers 558. The output of one amplifying portion is led to a pair of either one of the pairs of relays 210—214, the energizing circuit to either pair being controlled by the contacts 220—222 on the opposite set of relays which relays handle 110 volt and 25 amp. current. Thus when one photocell is energized one pair of relays is energized and vice versa. These relays control the necessary driving means to move the corrective means for duplicating or any other function and at the same time alter the position of the tracer head if necessary so that the same will return to its neutral position with the shutter allowing no light to either photocell.

Since a movement of $1/10000''$ will move the shutter to cut off, it will also be seen that instead of scanning the side of a model of any type this device might be used to establish limits on any material which might be carried past the end of the wheel 450, and if the material fell either within or without limits the photocells would energize rejecting apparatus to cause the material to be removed. It might also be used as a gage in centerless grinding, a contactor being used instead of the wheel 450 to ride the surface of the work, and when certain limits were reached the energization of the photocell caused by movement of the rod 448 could operate mechanism causing increase or decrease in the size of the grinding means while running. It is thus evident that I have provided control means having wide application to various fields which is simple and rugged of construction and which will operate on a very minute deviation from a neutral position in either direction.

I claim:

1. In a surface reproducing machine, a tracer arm, a rotary shutter operated thereby and balanced to a midpoint whereby longitudinal movement of the arm in either direction swings the aperture in the shutter to one side or the other, light sources, light sensitive means cooperating with the sources and spaced apart circumferentially of the shutter on opposite sides of the midpoint whereby one or the other unit is energized as the shutter oscillates back and forth, a movable frame supporting the tracer arm, driving means for moving the frame controlled from the light means whereby the light means controls the driving means to move the tracer arm in and out so that it keeps lightly against the surface at all times.

2. In a control system, an adjustable support, a housing mounted thereon, a plurality of spaced individual light sensitive cells mounted in the housing, a second housing also carried by the support and spaced from the first, a series of light sources carried by said second housing, tubular means interconnecting the two housings to conduct light from the source to its associated cell, shutter means mounted adjacent the tubular light conducting means to control the flow of light through the same and a work engaging lever system mounted on the support to operate the shutter and mechanism controlled by the response of said cells to adjust the support.

3. In a control system, an adjustable support, a plurality of aligned light sources and photoelectric cells on the support, an oscillating shutter mounted between the sources and cells to intercept the light going to one cell, the other or both, a work-engaging feeler connected to and actuating the shutter and means controlled by the output of the photocells to adjust the support.

4. In a control system, an adjustable support capable of movement in a plurality of directions, a plurality of aligned light sources and photoelectric cells on said support, an oscillating shutter mounted between the sources and cells to control the light flow therebetween, a work-engaging feeler connected to and actuating the shutter and means controlled by the output of one cell to move the support in one direction and by the other cell to move the support in another direction.

TRACY F. BRACKETT.